(12) United States Patent  (10) Patent No.: US 8,110,108 B2
Durda et al.  (45) Date of Patent: Feb. 7, 2012

(54) WASTEWATER TREATMENT SYSTEM

(75) Inventors: Daniel Durda, Tonka Bay, MN (US); G. Shawn Brown, Waconia, MN (US); Cory Mortenson, Chaska, MN (US)

(73) Assignee: Aeration Industries International LLC, Chaska, MN (US)

( * ) Notice: Subject to any disclaimer, the term of this patent is extended or adjusted under 35 U.S.C. 154(b) by 0 days.

(21) Appl. No.: 13/008,159

(22) Filed: Jan. 18, 2011

(65) Prior Publication Data

US 2011/0108479 A1 May 12, 2011

Related U.S. Application Data

(63) Continuation of application No. 12/724,293, filed on Mar. 15, 2010, now Pat. No. 7,892,433, which is a continuation of application No. 12/324,653, filed on Nov. 26, 2008, now Pat. No. 7,678,274, which is a continuation of application No. 11/470,184, filed on Sep. 5, 2006, now Pat. No. 7,465,394.

(51) Int. Cl.
C02F 3/06 (2006.01)

(52) U.S. Cl. ........ 210/612; 210/615; 210/629; 210/150; 210/194; 210/903; 210/926

(58) Field of Classification Search ........... 210/612, 210/615, 629, 150, 151, 194, 220, 242.2, 210/903, 926
See application file for complete search history.

(56) References Cited

U.S. PATENT DOCUMENTS

| 3,235,234 | A | | 2/1966 | Beaudoin |
| 3,739,912 | A | | 6/1973 | Miller, Jr. |
| 3,768,788 | A | | 10/1973 | Candel |
| 3,846,292 | A | | 11/1974 | Lecompte |
| 3,893,924 | A | * | 7/1975 | Le Compte et al. .......... 210/629 |
| 3,904,525 | A | | 9/1975 | Rosenberg |
| 3,984,323 | A | | 10/1976 | Evens |
| 4,051,035 | A | | 9/1977 | Boschen et al. |
| 4,190,543 | A | | 2/1980 | Pederson et al. |
| 4,207,180 | A | * | 6/1980 | Chang .......................... 210/612 |
| 4,240,990 | A | | 12/1980 | Inhofer et al. |
| 4,279,753 | A | | 7/1981 | Nielson et al. |
| 4,280,911 | A | | 7/1981 | Durda et al. |

(Continued)

FOREIGN PATENT DOCUMENTS

DE 102005032123 A1 1/2007

(Continued)

OTHER PUBLICATIONS

Korkut, et al., "Wastewater Treatment with Biomass Attached to Porous Geotextile Baffles," Journal of Environmental Engineering, Feb. 2006. p. 284-288. (5 pages).

*Primary Examiner* — Christopher Upton

(74) *Attorney, Agent, or Firm* — Seager, Tufte & Wickhem LLC

(57) ABSTRACT

Disclosed is a system for treating wastewater. The system includes a microorganism clad structure positioned in a body of wastewater such that the microorganism clad structure is at least partially submerged in the body of wastewater. The apparatus also includes an aeration device, such as a propeller-type, surface mounted aeration device, supplying a horizontal flow of oxygenated water to the microorganisms attached to the microorganism clad structure such that the microorganisms may carry out a biological process.

10 Claims, 10 Drawing Sheets

U.S. PATENT DOCUMENTS

| | | | |
|---|---|---|---|
| 4,288,394 | A | 9/1981 | Ewing et al. |
| 4,293,169 | A | 10/1981 | Inhofer |
| 4,308,221 | A | 12/1981 | Durda |
| 4,350,589 | A | 9/1982 | Stog |
| 4,370,234 | A | 1/1983 | Marsland |
| 4,409,100 | A | 10/1983 | Rajendren |
| 4,415,454 | A | 11/1983 | Fuchs |
| 4,479,876 | A | 10/1984 | Fuchs |
| 4,537,682 | A | 8/1985 | Wong-Chong |
| 4,632,758 | A | 12/1986 | Whittle |
| 4,741,825 | A | 5/1988 | Schiller |
| 4,774,031 | A | 9/1988 | Schurz |
| 4,806,251 | A | 2/1989 | Durda |
| 4,818,391 | A | 4/1989 | Love |
| 4,818,404 | A | 4/1989 | McDowell |
| 4,842,732 | A | 6/1989 | Tharp |
| 4,882,099 | A | 11/1989 | Durda et al. |
| 4,954,295 | A | 9/1990 | Durda |
| 5,076,929 | A | 12/1991 | Fuchs et al. |
| 5,078,923 | A | 1/1992 | Durda et al. |
| 5,122,266 | A | 6/1992 | Kent |
| 5,160,620 | A | 11/1992 | Lygren |
| 5,185,080 | A | 2/1993 | Boyle |
| 5,211,847 | A | 5/1993 | Kanow |
| 5,228,998 | A | 7/1993 | DiClemente et al. |
| 5,286,385 | A | 2/1994 | Jorgensen et al. |
| 5,316,671 | A | 5/1994 | Murphy |
| 5,326,459 | A | 7/1994 | Hlavach et al. |
| 5,326,475 | A | 7/1994 | Kent |
| 5,344,557 | A | 9/1994 | Scanzillo |
| 5,389,247 | A | 2/1995 | Woodside |
| 5,421,999 | A | 6/1995 | Poole et al. |
| 5,500,112 | A | 3/1996 | McDonald |
| 5,507,950 | A | 4/1996 | Senda et al. |
| 5,514,278 | A | 5/1996 | Khudenko |
| 5,531,894 | A | 7/1996 | Ball et al. |
| 5,545,327 | A | 8/1996 | Volland |
| 5,554,291 | A | 9/1996 | Scanzillo et al. |
| 5,556,536 | A | 9/1996 | Turk |
| 5,626,755 | A | 5/1997 | Keyser et al. |
| 5,651,892 | A | 7/1997 | Pollock |
| 5,681,471 | A | 10/1997 | Silverstein |
| 5,702,604 | A | 12/1997 | Yamasaki et al. |
| 5,707,562 | A | 1/1998 | Karliner |
| 5,744,072 | A | 4/1998 | Karliner |
| D401,547 | S | 11/1998 | Karliner |
| 5,846,425 | A | 12/1998 | Whiteman |
| 5,861,095 | A | 1/1999 | Vogel et al. |
| 5,863,435 | A | 1/1999 | Heijnen et al. |
| 5,954,451 | A | 9/1999 | Presby |
| 5,972,212 | A | 10/1999 | Hongo |
| 6,007,720 | A | 12/1999 | Tomita |
| 6,022,476 | A | 2/2000 | Hausin |
| 6,153,094 | A | 11/2000 | Jowett |
| 6,231,766 | B1 | 5/2001 | Hausin |
| 6,348,147 | B1 | 2/2002 | Long |
| 6,821,426 | B1 | 11/2004 | Hausin et al. |
| 6,942,788 | B1 | 9/2005 | Cox et al. |
| 7,008,539 | B2 | 3/2006 | Johnson et al. |
| 7,101,483 | B2 | 9/2006 | Volker et al. |
| 2004/0211723 | A1 | 10/2004 | Husain et al. |
| 2004/0245173 | A1 | 12/2004 | Johnson et al. |
| 2005/0242015 | A1 | 11/2005 | Curtis et al. |
| 2005/0269262 | A1 | 12/2005 | McBride |
| 2005/0284811 | A1 | 12/2005 | Potts |

FOREIGN PATENT DOCUMENTS

| | | |
|---|---|---|
| EP | 0949209 A2 | 10/1999 |
| EP | 1234804 A1 | 8/2002 |
| JP | 57197090 A | 3/1982 |
| WO | 0194266 A1 | 12/2001 |

* cited by examiner

WASTEWATER TREATMENT SYSTEM

RELATED APPLICATIONS

This application is a continuation of U.S. application Ser. No. 12/724,293 filed Mar. 15, 2010, which is a continuation of U.S. application Ser. No. 12/324,653 filed Nov. 26, 2008, now U.S. Pat. No. 7,678,274, which is a continuation of U.S. application Ser. No. 11/470,184 filed Sep. 5, 2006, now U.S. Pat. No. 7,465,394.

TECHNICAL FIELD

The disclosure generally relates to wastewater treatment systems. More particularly, the disclosure pertains to apparatus, structures, systems and methods for treating wastewater.

BACKGROUND

Wastewater treatment facilities, such as municipal, agricultural or industrial wastewater treatment facilities, commonly utilize aeration techniques in order to treat the wastewater. Aeration of the wastewater has been found to reduce or eliminate contaminants found in the wastewater by increasing the oxygen available to microorganisms which break down contaminants during a biological process. Such techniques have been found to reduce the BOD (biochemical oxygen demand) and/or ammonia levels found in wastewater. However, there is an ongoing need to provide more efficient modes of treating wastewater.

SUMMARY

The disclosure is directed to apparatus, structures, systems and methods for treating wastewater.

Accordingly, one illustrative embodiment is an apparatus for treating wastewater at a wastewater treatment facility. The apparatus includes a microorganism clad structure positioned in a body of wastewater such that the microorganism clad structure is at least partially submerged in the body of wastewater. The apparatus also includes an aeration device, such as a propeller-type, surface mounted aeration device, supplying a horizontal flow of oxygenated water to the microorganisms attached to the microorganism clad structure such that the microorganisms may carry out a biological process.

Another illustrative embodiment is a wastewater treatment system including a wastewater containment reservoir containing a body of wastewater. A baffled structure including a plurality of microorganism clad sheets of material are positioned in the wastewater containment reservoir such that the plurality of microorganism clad sheets are at least partially submerged in the body of wastewater. An aeration device, such as a propeller-type, surface mounted aeration device is positioned in the wastewater containment reservoir in proximity to the baffled structure. The aeration device provides an oxygenated flow of wastewater past the microorganisms such that the microorganisms may carry out a biological process in the body of wastewater.

An illustrative method of treating wastewater includes the steps of submerging a microorganism clad structure in a body of wastewater such that at least a portion of the microorganism clad structure is immersed in the body of wastewater. Oxygen may be injected into the body of wastewater with an aeration device, creating a high velocity fluid jet in the body of wastewater, thereby providing a horizontal flow of oxygenated water and/or nutrients past the microorganism clad structure to provide a favorable environment to carry out a biological process.

BRIEF DESCRIPTION OF THE DRAWINGS

The invention may be more completely understood in consideration of the following detailed description of various embodiments in connection with the accompanying drawings, in which.

Figure 1:
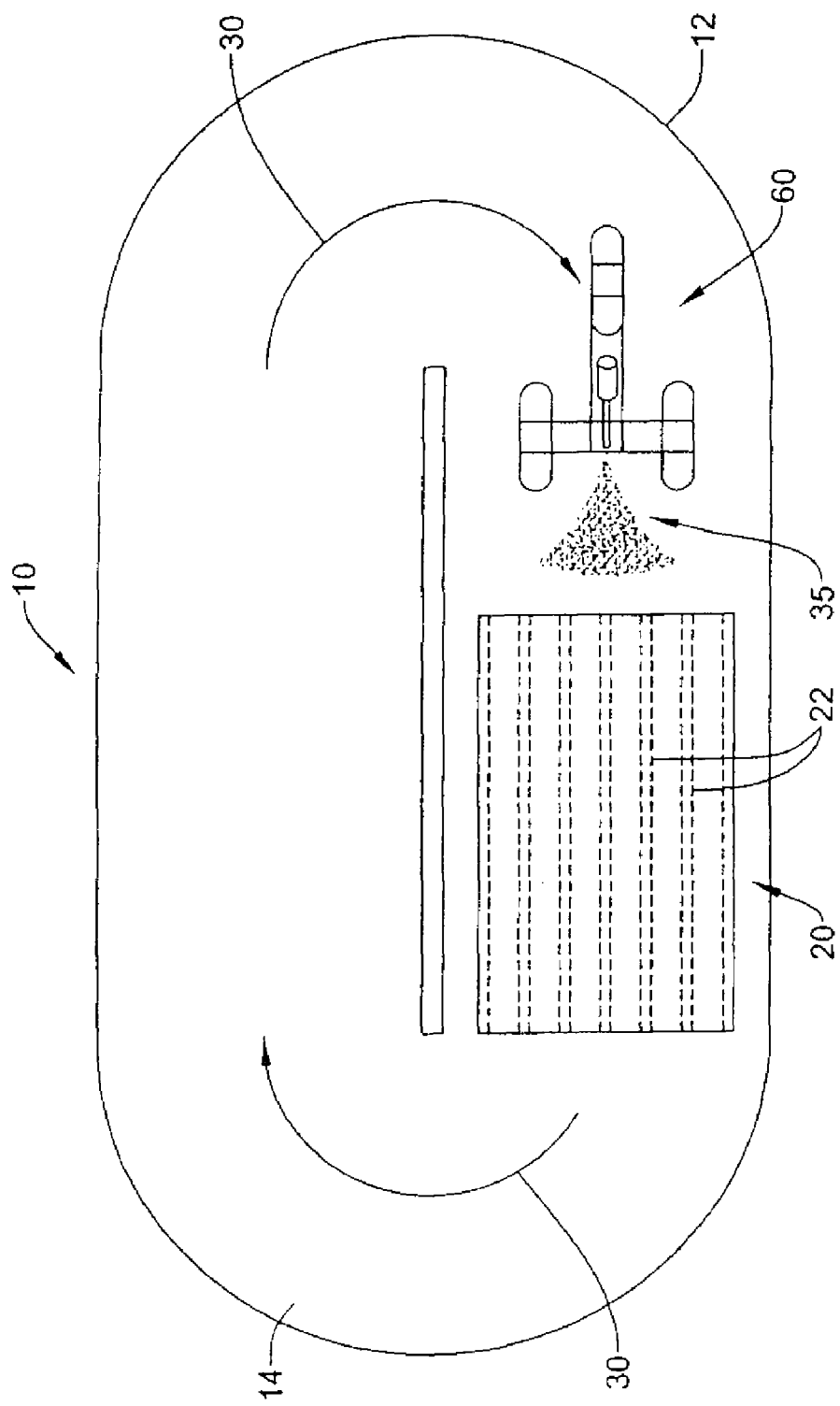
FIG. 1 is a top view of an exemplary wastewater treatment system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 2:
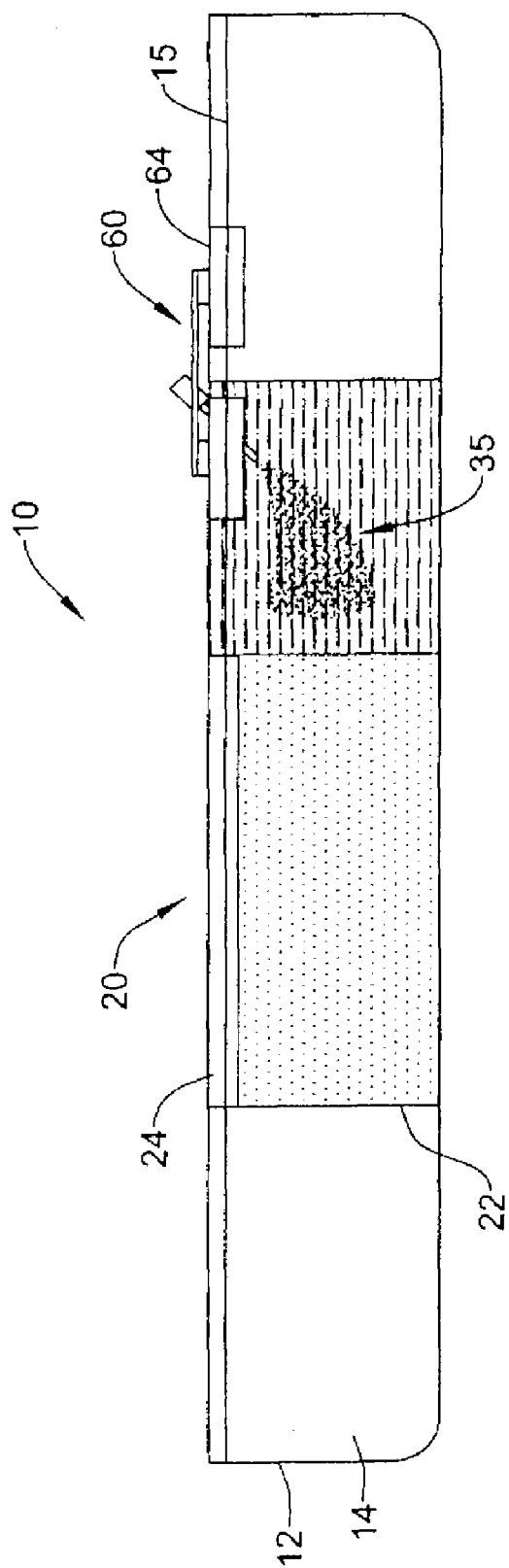
FIG. 2 is a side view of the exemplary wastewater treatment system of FIG. 1.

Now referring to the drawings, an illustrative wastewater treatment system 10 is illustrated in FIGS. 1 and 2. The wastewater treatment system 10 includes a reservoir 12 containing a quantity of wastewater 14. Although depicted as an oxidation oval, the reservoir 12 may be a lagoon, such as an earthen or concrete lagoon, a basin, a pond, a tank, or the like. The wastewater 14, prior to being treated, includes undesired contaminants such as high levels of BOD and/or ammonia.

Figure 4A:
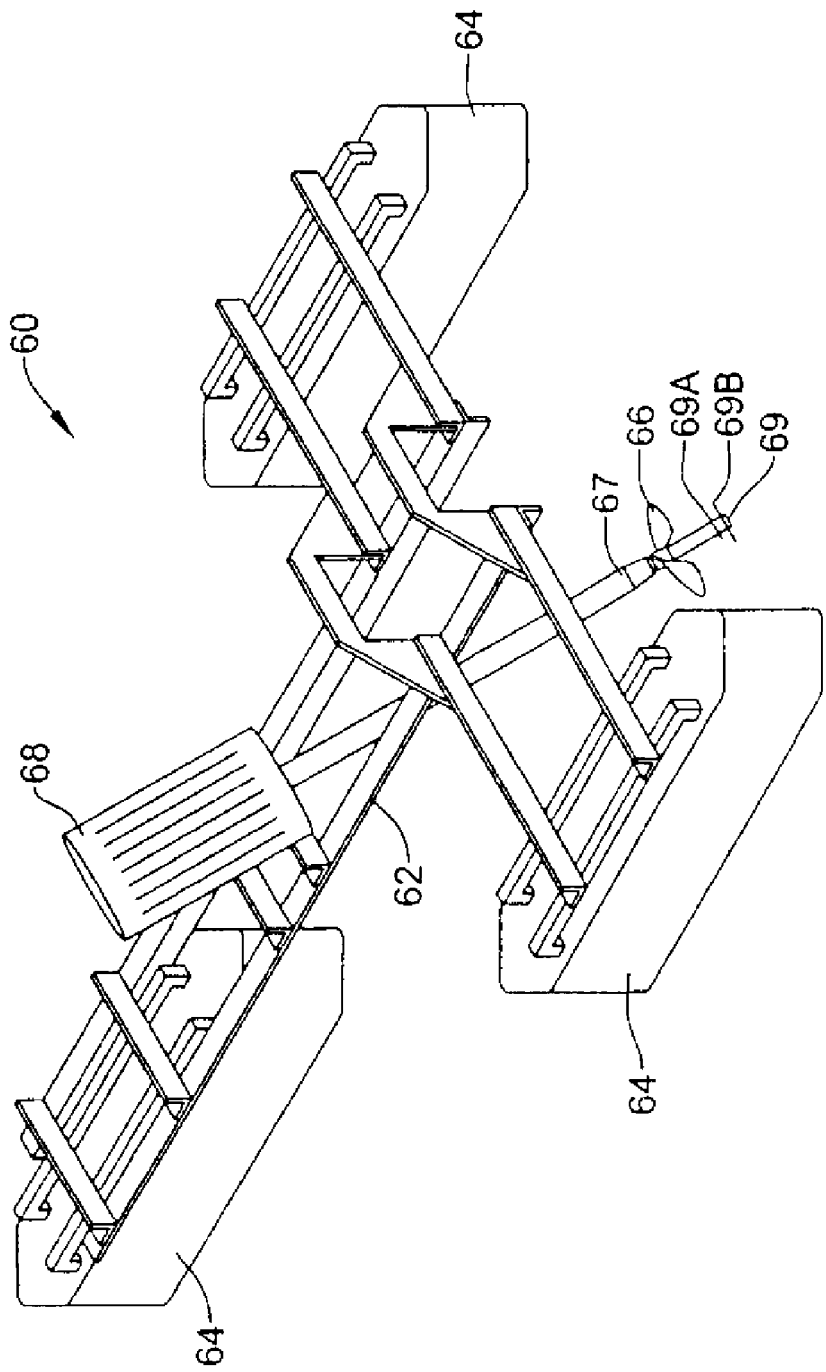
FIG. 4A is a perspective view of an exemplary aeration device which may be used in a wastewater treatment system.
Figure 4B:
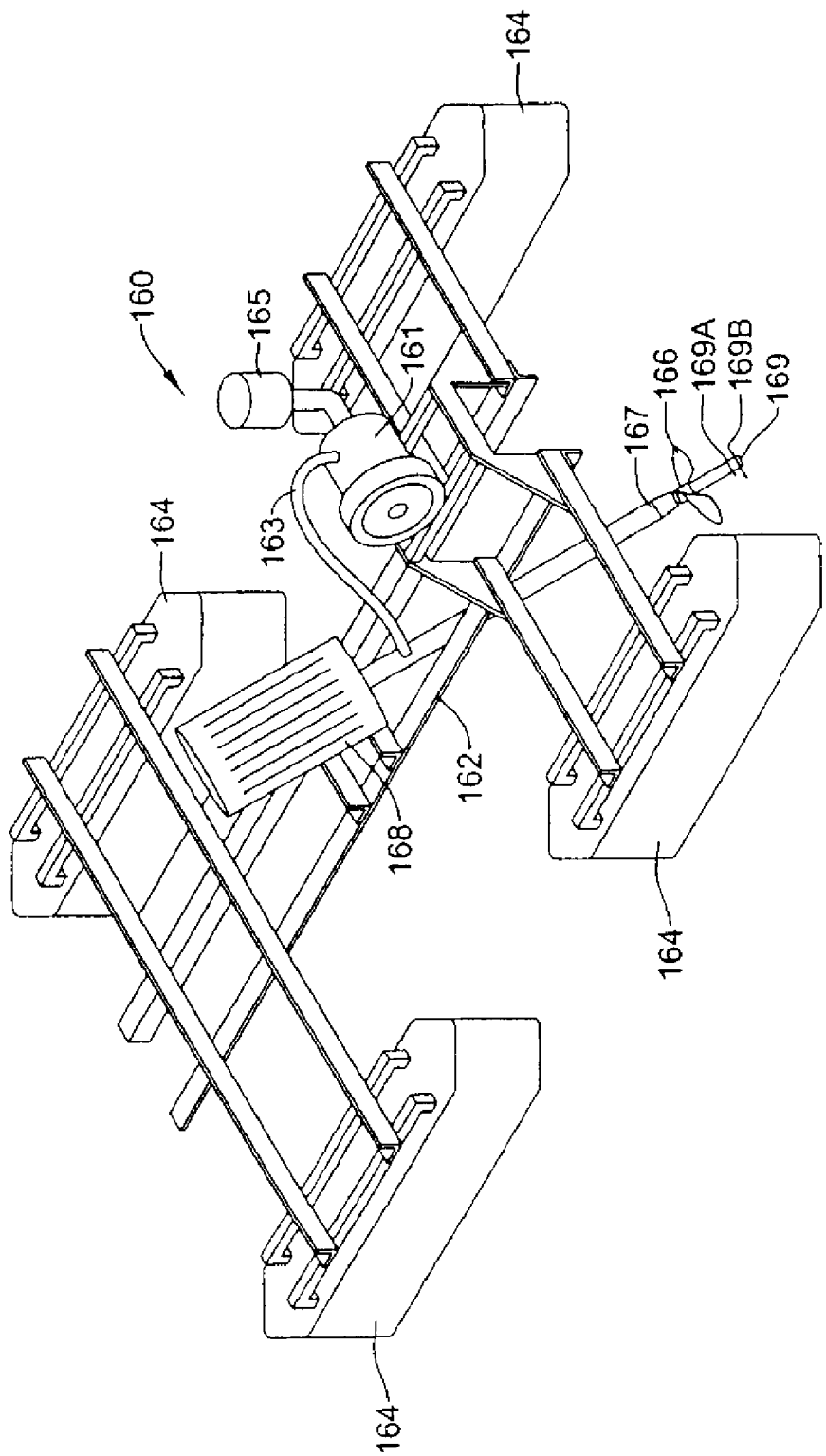
FIG. 4B is a perspective view of another exemplary aeration device which may be used in a wastewater treatment system.

An aeration device 60 (or aeration device 160 as shown in FIG. 4B) is positioned in the wastewater 14. As shown in FIG. 2, the aeration device 60 may be positioned on the surface 15 of the wastewater 14, such that a portion of the aeration device 60 is submerged in the wastewater 14. In some embodiments, the aeration device 60 may be a propeller-type, surface mounted aeration device. Some examples of suitable aeration devices which may be utilized are disclosed in commonly owned U.S. Pat. Nos. 4,240,990; 4,280,911; 4,741,825; 4,774,031; 4,806,251; 4,882,099; 4,954,295; 5,078,923 and 5,744,072, the disclosures of which are herein incorporated by reference. In such embodiments, the propeller (shown in FIG. 4A) of the aeration device 60 is submerged below the surface 15 of the wastewater 14. The aeration device 60 may include one or more floatation members 64 providing floatation of the aeration device 60 on the surface 15 of the wastewater 14. However, in other embodiments the aeration device 60 may be positioned in the wastewater 14 by other means. For example, the aeration device 60 may be secured to a rigid member and/or a wall of the reservoir 12, such that the aeration device 60 may be supported in or over the wastewater 14.

The wastewater treatment system 10 also includes a microorganism clad structure 20. The microorganism clad structure 20 may include a baffled structure, such as a plurality of sheets 22 having a population of microorganisms attached to the plurality of sheets 22. In some embodiments the sheets 22 may be spaced apart and generally parallel to one another. For example, in some embodiments the sheets 22 may be spaced apart at about 0.5 feet, about 1 foot, about 1.5 feet, about 2 feet, about 2.5 feet, or about 3 feet intervals. Although some suitable dimensions are disclosed, one of skill in the art would understand that desired dimensions may deviate from those expressly disclosed. The space between sheets 22 may be determined for a given application in order to optimize wastewater flow therethrough.

The microorganism clad structure 20 may also include one or more, or a plurality of floatation devices 24 providing floatation of the microorganism clad structure 20 on the surface 15 of the wastewater 14. However, in other embodiments, the microorganism clad structure 20 may be positioned in the wastewater 14 by other means. For example, the microorganism clad structure 20 may be secured to a rigid member and/or a wall of the reservoir 12 such that a portion of the microorganism clad structure 20 may be supported in or over the wastewater 14.

The microorganism clad structure 20 may be positioned in the wastewater 14 such that at least a portion of the plurality of sheets 22 are submerged in the wastewater 14. In some embodiments, the plurality of sheets 22 may extend substantially to the bottom of the reservoir 12, or the sheets 22 may extend downward any portion of the depth of the wastewater 14 in the reservoir 12. In some embodiments, the plurality of sheets 22 may extend substantially the same distance. However, in other embodiments, a portion of the sheets 22 may extend a different distance than another portion of the sheets 22.

The aeration device 60 may be positioned in proximity to the microorganism clad structure 20 such that the propeller of the aeration device 60 is directed toward an open end of the plurality of sheets 22. For example, in some embodiments, the aeration device 60 may be positioned about 5 feet, about 10 feet, about 15 feet, or about 20 feet from the microorganism clad structure 20. The aeration device 60 may introduce oxygen (e.g., pure oxygen, ambient air, or other fluid containing an amount of oxygen) below the surface 15 of the wastewater 14. For example, the aeration device 60 may inject oxygen into the wastewater 14, creating a fluid jet 35 directed toward the microorganism clad structure 20, dispersing oxygen and/or imparting velocity in the wastewater in a horizontal direction. Therefore, the aeration device 60 may provide a horizontal flow (represented by arrows 30) of oxygenated water past the baffled structure (e.g., the plurality of sheets 22) of the microorganism clad structure 20 to provide a favorable environment to carry out a biological process. The aeration device 60 may generate a horizontal flow of oxygenated water through the plurality of sheets 22 generating a positive velocity between the length of the channels created by the plurality of sheets 22.

Figure 3:
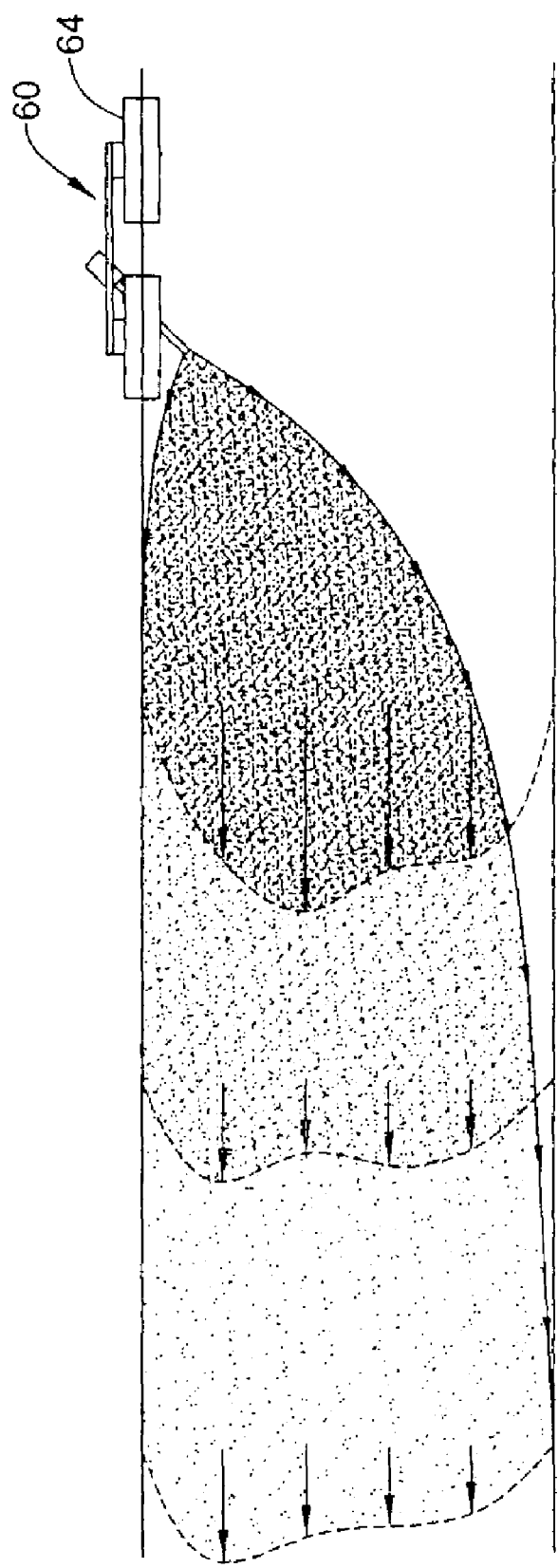
FIG. 3 is a depiction of an exemplary horizontal flow which may be achieved within a wastewater treatment system.

An illustrative depiction of an exemplary horizontal flow which may be achieved with a propeller-type, surface mounted aeration device 60 is shown in FIG. 3. As shown in FIG. 3, a subsurface horizontal flow of oxygenated water may be achieved through a substantial portion of the depth of the body of wastewater 14.

In embodiments wherein the microorganism clad structure 20 and/or the aeration device 60 include floatation members, the microorganism clad structure 20 and/or the aeration device 60 may be incorporated into an existing reservoir, such as a lagoon, without extensive modifications of the existing structure and/or arrangement of the reservoir.

An exemplary aeration device 60, which may be used in the wastewater treatment system 10, is further described in FIG. 4A. The aeration device 60 includes a frame 62 and one or more floatation members 64 attached to the frame 62. The floatation members 64 allow the aeration device 60 to float on the surface of a body of wastewater. The aeration device 60 further includes a propeller 66 driven by a motor 68. Rotational motion generated by the motor 68 may be transferred to the propeller 66 through the shaft 67. Oxygen may be directed through the shaft 67 to the diffuser 69, where the oxygen is introduced to the body of wastewater. Diffuser 69 can include a first disc 69A and a larger second disc 69B. Oxygen introduced to the wastewater below the surface of the wastewater may exit the aeration device 60 in a high velocity stream of fine bubbles as it is diffused into the wastewater through the diffuser 69. In some embodiments, compressed oxygen may be pushed through the shaft 67, or in other embodiments, oxygen may be drawn through the shaft 67 by a vacuum created by rotation of the propeller 66. In the embodiment illustrated in FIG. 4A, oxygen may be drawn through the shaft 67 by a vacuum created by rotation of the propeller 66. The propeller 66, which provides mixing of the wastewater, and the diffuser 69, which diffuses oxygen into the wastewater, may be positioned below the surface of the wastewater when the floatation members 64 are floating on the surface of the wastewater. For example, in some embodiments the propeller 66 and/or the diffuser 69 may be positioned about 1 foot, about 2 feet, about 3 feet, or about 4 feet below the surface of the wastewater. Thus, oxygen, in the form of fine bubbles, may be injected below the surface of the wastewater in a fluid jet.

Another exemplary aeration device 160, which may be used in the wastewater treatment system 10, is described in FIG. 4B. The aeration device 160 includes a frame 162 and one or more floatation members 164 attached to the frame 162. The floatation members 164 allow the aeration device 160 to float on the surface of a body of wastewater. The aeration device 160 further includes a propeller 166 driven by a motor 168. Rotational motion generated by the motor 168 may be transferred to the propeller 166 through the shaft 167. Oxygen may be directed through the shaft 167 to the diffuser 169, where the oxygen is introduced to the body of wastewater. Diffuser 169 can include a first disc 169A and a larger second disc 169B. Oxygen introduced to the wastewater below the surface of the wastewater may exit the aeration device 160 in a high velocity stream of fine bubbles as it is diffused into the wastewater through the diffuser 169. In some embodiments, compressed oxygen may be pushed through the shaft 167, or in other embodiments, oxygen may be drawn through the shaft 167 by a vacuum created by rotation of the propeller 166. In the embodiment illustrated in FIG. 4B, which may be considered a forced air aeration device, oxygen may be pulled through an intake 165 by a motor 161 and pushed through a tube 163 to the shaft 167. Thus, the aeration device 160 may supply compressed air below the surface of the wastewater in a high velocity stream of bubbles. The propeller 166, which provides mixing of the wastewater, and the diffuser 169, which diffuses oxygen into the wastewater, may be positioned below the surface of the wastewater when the floatation members 164 are floating on the surface of the wastewater. For example, in some embodiments the propeller 166 and/or the diffuser 169 may be positioned about 1 foot, about 2 feet, about 3 feet, or about 4 feet below the surface of the wastewater. Thus, oxygen, in the form of fine bubbles, may be injected below the surface of the wastewater in a fluid jet.

An exemplary microorganism clad structure 20, which may be a baffled structure in some embodiments, that may be used in the wastewater treatment system 10, is further described in FIGS. 5A-5D. The microorganism clad structure 20 may include a plurality of sheets 22. The plurality of sheets 22 may be spaced apart and generally parallel to one another. As shown in the Figures, the sheets 22 may be oriented in a generally vertical orientation. However, in other embodiments, the sheets 22 may be oriented at an angle, such as an oblique or a perpendicular angle to the vertical. In some embodiments, the sheets 22 may have a length of about 10 feet to about 40 feet, about 10 feet to about 25 feet, or about 15 feet to about 20 feet. In some embodiments, the sheets may have a height of about 5 feet to about 20 feet, about 10 feet to about 20 feet, or about 10 feet to about 15 feet. Although some suitable dimensions are disclosed, one of skill in the art would understand that desired dimensions may deviate from those expressly disclosed. The dimensions of the sheets 22 may be determined based on parameters of a specific application.

The plurality of sheets 22 may be secured to one or more, or a plurality of support members. As shown in the Figures, the support member may be a floatation member 24, wherein an edge, such as the upper edge of the sheets 22 may be secured to the floatation member 24. The floatation member 24 may take on any form which provides buoyancy to the microorganism clad structure 20. For example, in some embodiments, the floatation member 24 may be one or more air filled chambers, one or more foam members, or other members exhibiting buoyancy in water. In the embodiment illustrated in FIGS. 5A-5D, each of the plurality of sheets 22 is attached to a floatation member 24. However, in other embodiments, one or more sheets 22 may be attached to a single floatation member 24, as desired.

In some embodiments, the lower edge of the sheets 22 may include a support member or ballast 21 or other means of maintaining the plurality of sheets 22 submerged in the wastewater. For example, in some embodiments, each of the sheets 22 may be secured in a frame. In other embodiments, the lower edge of the sheets 22 may be secured to one another, such that the plurality of sheets 22 maintain a desired placement within the wastewater. In yet other embodiments, the plurality of sheets 22 may have a density greater than the density of the wastewater.

In some embodiments, the plurality of sheets 22 may be secured together with one or more spacers 23 extending between adjacent sheets 22. The spacers 23 may maintain the plurality of sheets 22 an equal, or otherwise consistent distance apart during operation. For example, in the illustrated embodiment, spacers 23 may be located between adjacent sheets 22 at locations proximate the floatation members 24, the support members or ballast 21, and/or one or more intermediate locations along the plurality of sheets 22.

Each of the plurality of sheets 22 may include one or more panels. For example, each sheet 22 may include three panels as shown in the illustrative embodiment. However, in other embodiments, the sheets 22 may include 1, 2, 4, 5 or more panels. As shown in the Figures, each of the sheets 22 may include a first panel 27, a second panel 28, and a third panel 29. During operation, the microorganism clad structure 20 may be positioned in the wastewater in proximity to the aeration device 60 such that the first panel 27 is positioned closest to the aeration device 60. Due to the forces generated by the aeration device 60 in creating a fluid jet 35 of fine bubbles, thereby instilling a horizontal flow in the wastewater, the first panel 27 may be stronger than the second panel 28 and the third panel 29 in order to endure hydrodynamics of the wastewater. In some embodiments, the second panel 28, likewise, may be stronger than the third panel 29. Thus, the panels 27, 28 may be incrementally stronger than the adjacent panel 28, 29, respectively, in the direction of the aeration device 60.

The plurality of sheets 22 may be formed of a material conducive to microorganism growth and attachment thereon. In some embodiments, the plurality of sheets 22 may be formed of a textile material. For example, the plurality of sheets 22 may be formed of a textile material, such as a non-biodegradable geo-textile, having a high effective surface area. In describing the textile material as having a high effective surface area, it is intended to mean the textile material has a surface area greater than that computed by taking into account the outer periphery of the textile material alone. For example, the textile material may be porous, convoluted, woven, honeycombed, or may have other structure providing a high effective surface area.

A population of microorganisms 40, or bio-film, is attached to the plurality of sheets 22. The population of microorganisms 40 may be attached to both sides of the sheets 22, or the population of microorganisms 40 may be attached to only one side of the sheets 22 if desired. The population of microorganisms 40 may include bacteria, such as BOD reducing bacteria, nitrifying bacteria and/or denitrifying bacteria which may carry out a biological process, such as BOD reduction, nitrification and/or denitrification in the wastewater.

BOD (biochemical oxygen demand) is an indicator commonly used to measure the quality of a body of wastewater. BOD is a measurement of the amount of oxygen required to decompose the quantity of organic particles in the body of wastewater. Thus, BOD reduction is a process in which the level of BOD in a body of wastewater is reduced to improve the quality of the body of wastewater. Heterotrophic bacteria are one type of bacteria which may be used to perform reduction of BOD levels in the wastewater.

Nitrification is the biological oxidation of ammonia ($NH_3$) with oxygen ($O_2$) which forms nitrite ($NO_2$), followed by the oxidation of nitrites into nitrates ($NO_3^-$). Nitrification is an aerobic process utilizing oxygen to carry out the process. Nitrosomonas and nitrobacter are two types of nitrifying bacteria, which may be used to perform the oxidation of ammonia to nitrate in the wastewater. It has been found nitrification may be enhanced through the inclusion of a bio-film of microorganisms on a substrate, as opposed to free-floating bacterial colonies within the wastewater.

Denitrification is the biological process of reducing nitrates ($NO_3^-$) into gaseous nitrogen ($N_2$). Denitrification is an anaerobic process, which takes place in the absence of oxygen. Pseudomonas are one type of denitrifying bacteria which may be used to perform reduction of nitrates in the wastewater.

The sheets 22 may be inoculated with a desired quantity of BOD reducing bacteria, nitrifying bacteria and/or denitrifying bacteria. The quantity of bacteria may be determined, among other factors, by the quantity of wastewater to be treated, the duration of treatment, and/or the levels of contaminants found in the wastewater.

Figure 5A:
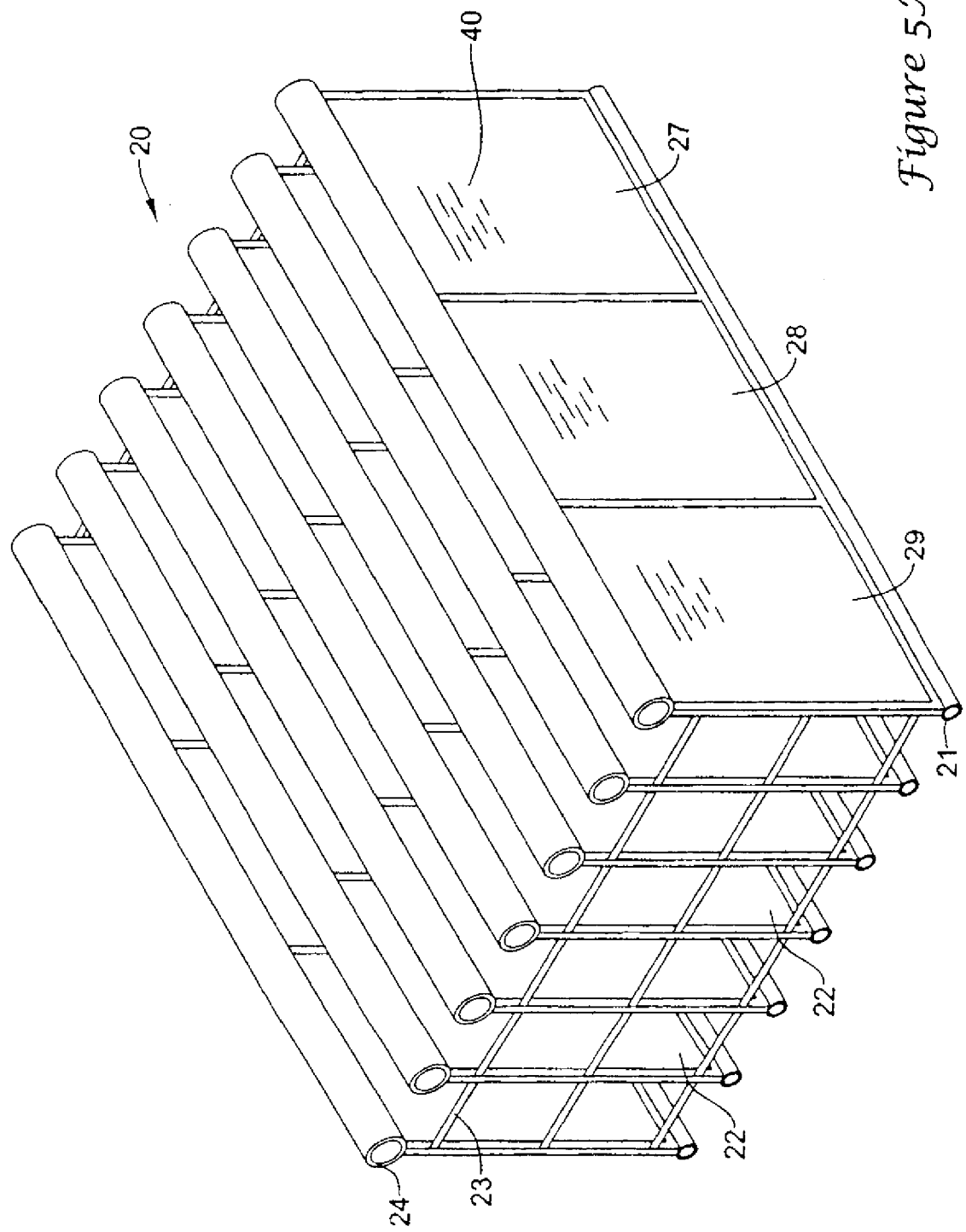
FIGS. 5A-5D illustrate an exemplary microorganism clad structure which may be used in association with an aeration device in a wastewater treatment system.
Figure 5B:
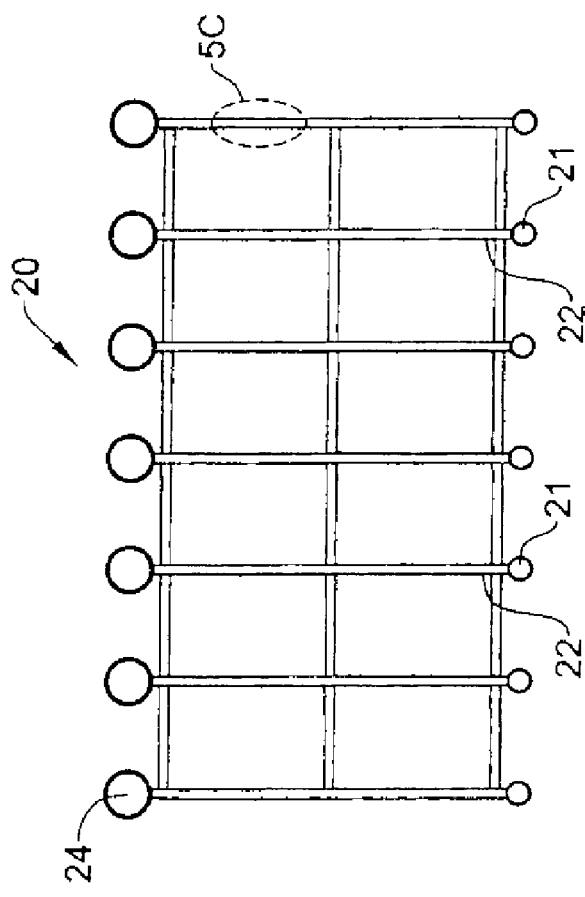
Figure 5C:
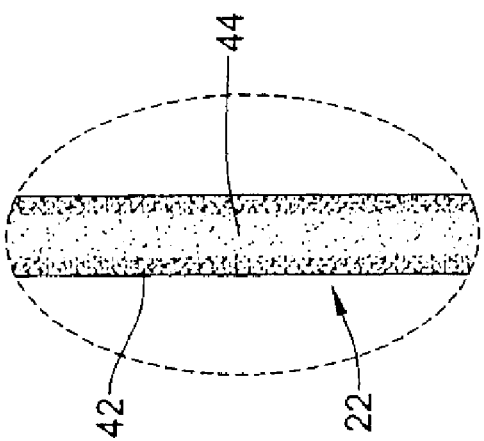
Figure 5D:
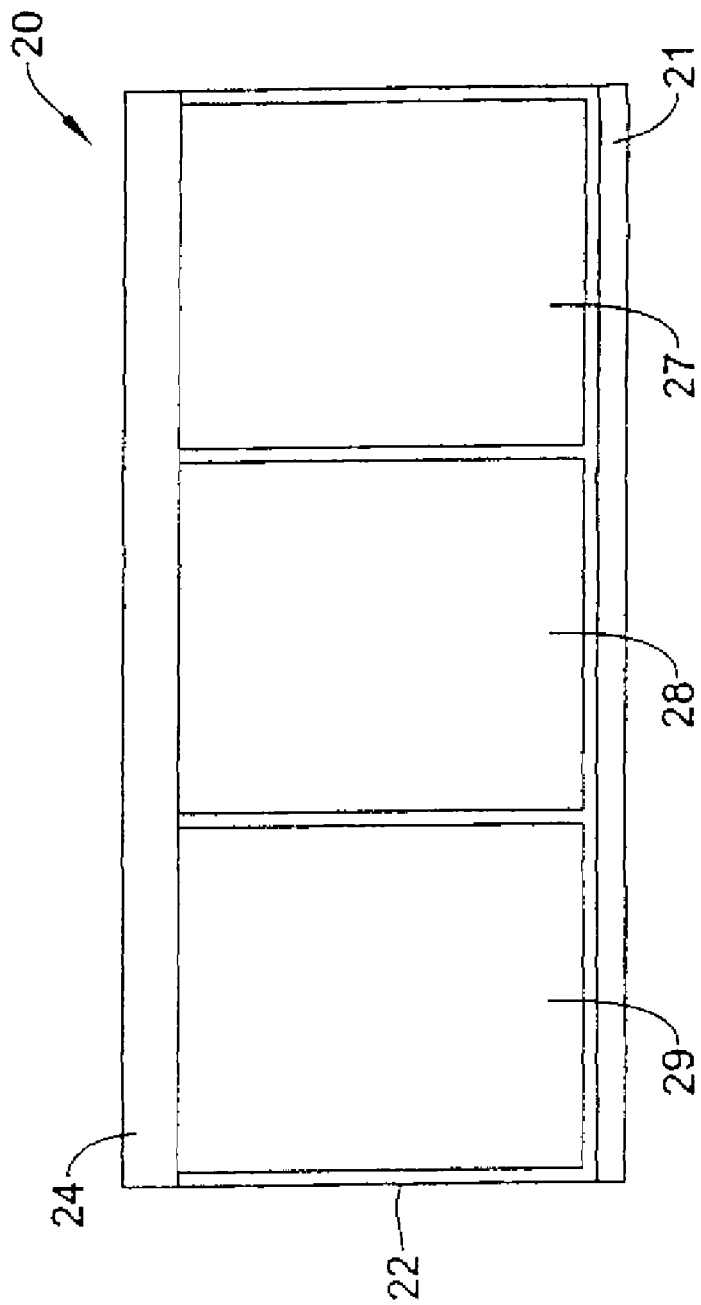

As shown in FIG. 5C, the sheets 22 may include an aerobic zone 42, which is an oxygen enriched zone, located at the surface of the sheet 22. Nitrifying bacteria may be located in the nitrification zone 42 in order to carry out a nitrification process in the wastewater. Oxygenated water generated by the aeration device 60 may be readily available to nitrifying bacteria located in the nitrification zone 42. The sheets 22 may also include a denitrification zone 44, which is an oxygen depleted zone, located within an internal portion of the sheet 22. As the internal portion of the sheet 22 may be isolated from oxygen, denitrifying bacteria may be located in the denitrification zone 44 in order to carry out a denitrification process in the wastewater. Thus, in some embodiments, nitrifying bacteria may be located in boundary layers bounding an internally located colonization of denitrifying bacteria. In embodiments in which the sheets 22 include both nitrifying bacteria and denitrifying bacteria, the wastewater may undergo nitrification and at least partial denitrification, simultaneously.

Figure 6:
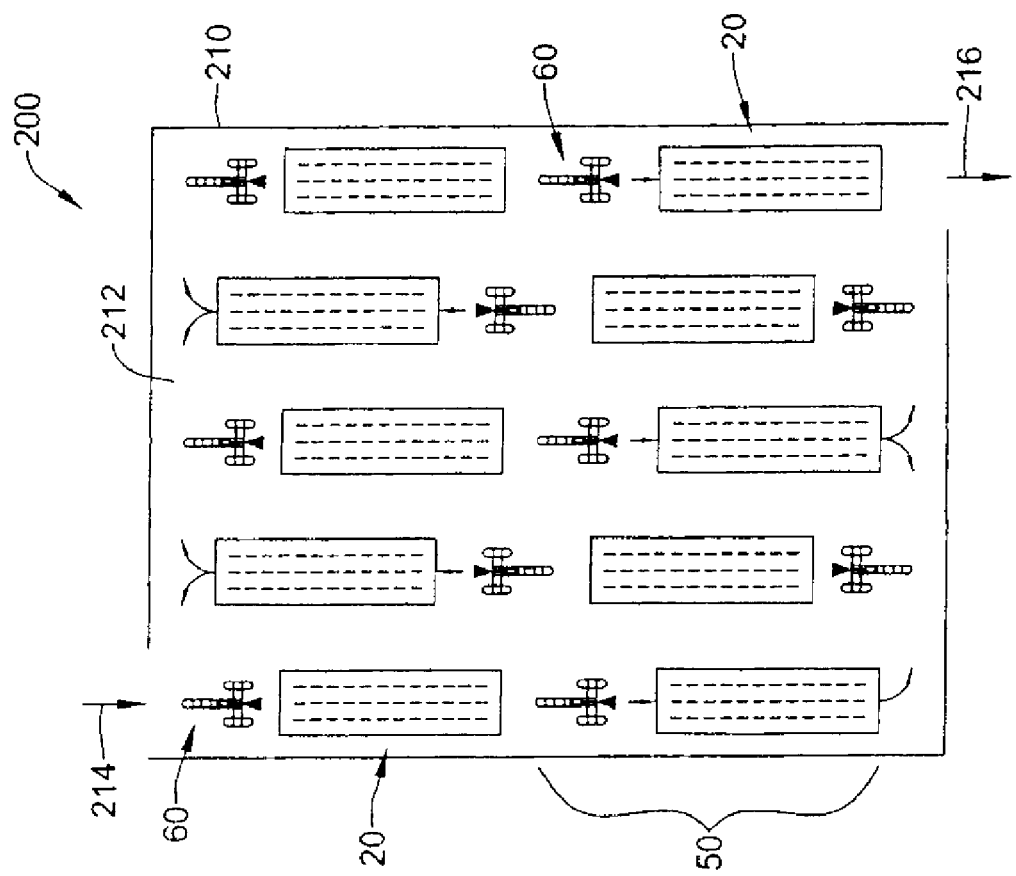
FIG. 6 is another exemplary wastewater treatment system utilizing a plurality of aeration devices and a plurality of microorganism clad structures.

Another illustrative wastewater treatment system 200 is illustrated in FIG. 6. The wastewater treatment system 200 includes a reservoir 210 containing a body of wastewater 212. Contaminant enriched wastewater may enter the reservoir 210 through influent pathway 214 and upon sufficient treatment, contaminant depleted wastewater may exit the reservoir 210 through effluent pathway 216.

A plurality of aeration devices 60 and microorganism clad structures 20 may be positioned in the reservoir 210. As shown in FIG. 6, each aeration device 60 may be paired with one microorganism clad structure 20. Therefore, the combination of an aeration device 60 paired with a microorganism clad structure 20 may be considered a wastewater treatment unit 50. An aeration device 60, positioned in proximity to a microorganism clad structure 20, may distribute nutrients and/or oxygen through mixing and aeration to the bio-film (i.e., the population of microorganisms) in order to keep the bio-film healthy and to continuously renew the bio-film through facilitation of the sloughing process.

The wastewater treatment units 50, each including an aeration device 60 and a microorganism clad structure 20, may be positioned in an array, or other desired orientation, within the reservoir 210. The arrangement of the wastewater treatment units 50 may be chosen to establish a desired flow pathway of wastewater throughout the reservoir 210 as indicated by the arrows in FIG. 6. For example, the wastewater treatment units 50 may be arranged such that the aeration devices 60 provide a continuous circulation of flow of oxygenated water through the microorganism clad structures 20. Such an arrangement allows for multiple passes of wastewater past the microorganism clad structures 20 to enhance the treatment efficiency of the wastewater treatment system 200, by increasing the contact time between the wastewater 212 and the bio-film attached to the microorganism clad structure 20. Additionally, by maintaining the wastewater 212 in a continuous circulation pathway, solids found in the wastewater 212 may remain in suspension and not settle to the bottom of the reservoir 210.

It has been found that water temperature has a signification impact on nitrification by nitrifying bacteria in wastewater. Thus, nitrification rates are directly related to seasonal temperature changes. It has been found that nitrification is maximized when water temperatures are greater than 20° C. The rate of nitrification decreases as water temperature drops. As water temperatures approach 0° C., nitrification is inhibited and the rate of nitrification approaches zero. Therefore, in geographic regions which experience nitrification inhibiting temperatures, sufficient nitrification occurs at only certain times of the year. The use of the aeration devices 60 in conjunction with microorganism clad structures 20 within a wastewater reservoir as disclosed herein, may increase the water temperature of the wastewater due to the continuous circulation of the wastewater through the reservoir. In addition, the concentrated biological communities found on the microorganism clad structures 20 may significantly increase the biological population density in the system, leading to an increase in the sludge age and hence the residence time of the microorganisms. Therefore, sufficient nitrification within the reservoir may be achieved for a greater portion of the year, or in many cases year-round. The higher rates of nitrification during cold weather may be attributed to the energy added to the wastewater by the mixing and/or high fluid flow velocities generated by the aeration device 60 combined with the increase in biological population density and residence time.

Figure 7:
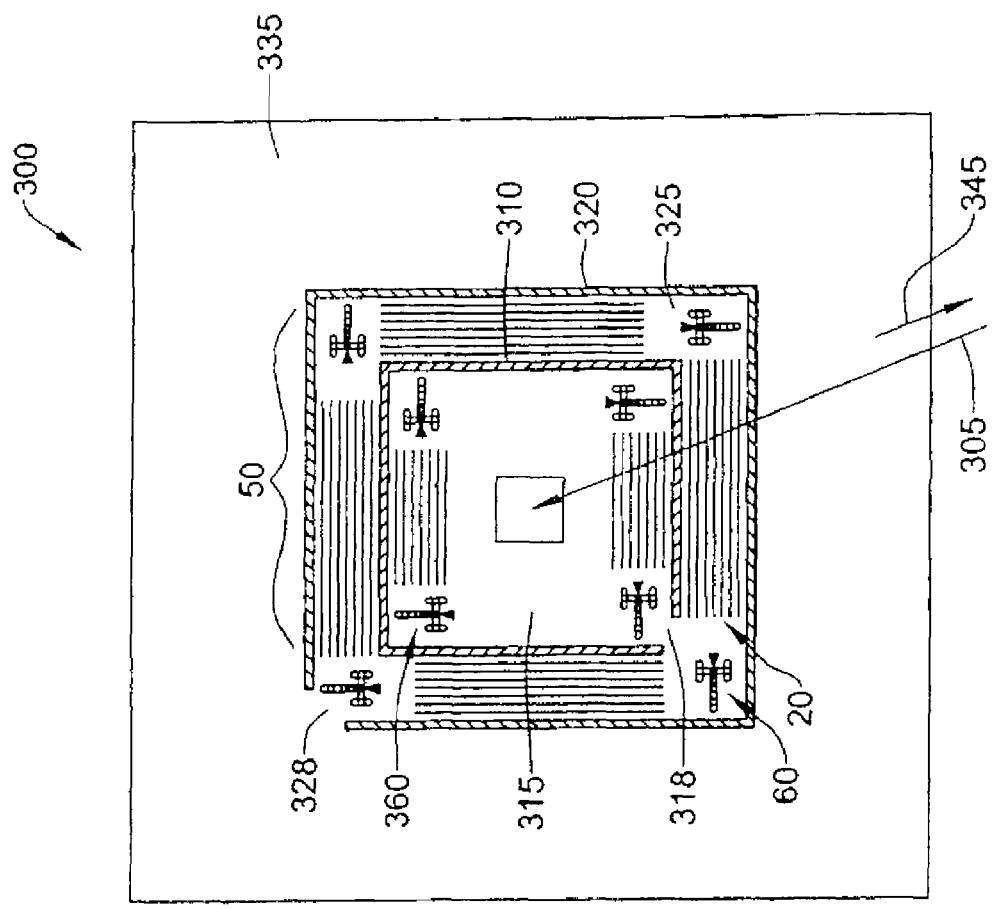
FIG. 7 is yet another exemplary wastewater treatment system utilizing a plurality of aeration devices and a plurality of microorganism clad structures within a zone of the wastewater treatment system.

Another illustrative wastewater treatment system 300 is illustrated in FIG. 7. The wastewater treatment system 300 is illustrated as including multiple stages. A first stage may be a BOD (biological oxygen demand)/TSS (total suspended solids) reduction zone 315 in which aeration may be utilized to reduce the BOD/TSS levels of the wastewater. Aeration may be performed with an aerator or multiple aerators, such as the aeration device 60 illustrated in FIG. 4A or the aeration device 160 illustrated in FIG. 4B, or aeration may be performed by another aeration device known in the art. In some embodiments, such as illustrated in FIG. 7, one or more, or a plurality of microorganism clad structures 20 may also be located in the BOD/TSS reduction zone 315. However, in other embodiments, the BOD/TSS reduction zone 315 may be devoid of microorganism clad structures 20.

A second stage may be a nitrification/denitrification zone 325 in which nitrification and/or denitrification occurs. In some embodiments, the wastewater treatment system 300 may be configured such that nitrification and/or denitrification occurs almost exclusively in the nitrification/denitrification zone 325. Furthermore, a discharge zone 335, which in some embodiments may be considered a quiescent zone, may contain treated wastewater discharged from the nitrification/denitrification zone 325.

A baffle 310 may separate the BOD/TSS reduction zone 315 from the nitrification/denitrification zone 325. The baffle 310 may include an opening 318 allowing passage of wastewater from the BOD/TSS reduction zone 315 to the nitrification/denitrification zone 325. Likewise, a baffle 320 may separate the nitrification/denitrification zone 325 from the discharge zone 335. The baffle 320 may include an opening 328 allowing passage of wastewater from the nitrification/denitrification zone 325 to the discharge zone 335.

The BOD/TSS reduction zone 315 may include one or a plurality of aerators 360, which in some instances may be the aeration device 60 illustrated in FIG. 4A or the aeration device 160 illustrated in FIG. 4B, to perform aeration in the BOD/TSS reduction zone 315, or aeration may be performed by another aeration device known in the art. In some embodiments, one or more microorganism clad structures 20 may be included in the BOD/TSS reduction zone 315 to improve BOD removal in certain applications, such as in instances where the hydraulic retention time of the wastewater is determined to be too short and/or where influent BOD loading is determined to be too high. However, in other embodiments BOD/TSS reduction zone 315 may be devoid of microorganism clad structures 20. In the illustrative embodiment, influent wastewater enters the BOD/TSS reduction zone 315 by the influent pathway schematically depicted as element 305. The aerators 360 create a continuous flow of wastewater in the BOD/TSS reduction zone 315, in which a quantity of wastewater may steadily migrate into the nitrification/denitrification zone 325 through the opening 318.

The nitrification/denitrification zone 325 may include a plurality of aeration devices 60 and microorganism clad structures 20. As shown in FIG. 7, each aeration device 60 in the nitrification/denitrification zone 325 may be paired with one microorganism clad structure 20. Therefore, the combination of an aeration device 60 paired with a microorganism clad structure 20 may be considered a wastewater treatment unit 50. The aeration devices 60 located in the nitrification/denitrification zone 325 create a continuous flow of wastewater through and past the microorganism clad structures 320, thus providing a flow of oxygenated water through the microorganism clad structures 20. As shown in FIG. 7, the wastewater treatment units 50 are arranged in a circular pattern such that a circular flow pathway is established in the nitrification/denitrification zone 325. Therefore, the continuous cyclic flow of the wastewater provides recirculation of the wastewater past the bio-film (i.e., the population of microorganisms) attached to the microorganism clad structures 20 multiple times in order to increase treatment efficiency of the wastewater. The aeration devices 60 may distribute nutrients through mixing and aeration to the bio-film in order to keep the bio-film healthy and to continuously renew the bio-film through facilitation of the sloughing process. Thus, the bio-film may carry out a biological process, such as nitrification and/or denitrification of the wastewater in the nitrification/denitrification zone 325.

The opening 328 between the nitrification/denitrification zone 325 allows a steady flow of wastewater to migrate into the discharge zone 335. Zone 335 may typically be a settling zone where suspended solids are settled prior to effluent discharge. From the discharge zone 335, the treated wastewater may exit the wastewater treatment system 300 by way of the effluent pathway schematically depicted as element 345.

The disclosed wastewater treatment systems may be incorporated into existing wastewater treatment reservoirs, such as lagoons, with minimal modifications to the reservoir. Thus, installation of the disclosed wastewater treatment systems in an existing reservoir may be found uncomplicated, without extensive modifications of the existing reservoir. The quantity and position of the components may be determined by the size of the body of wastewater, desired contaminant reduction of the wastewater, and/or the time allocated to treatment of a specified quantity of wastewater. Thus, the layout of the components may be customized based on the specific parameters of the reservoir in order to maximize efficiency of the system. Furthermore, the disclosed wastewater treatment systems may be installed in static bodies of wastewater or in continuous flow bodies of wastewater.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A method of treating wastewater; the method comprising:
    deploying a plurality of floating wastewater treatment devices within a wastewater containment reservoir containing a body of wastewater, each of the plurality of floating wastewater treatment devices having an input region and an output region, each of said plurality of floating wastewater treatment devices comprising:
        a microorganism clad structure at least partially submerged in the body of wastewater paired with an upstream aeration device which provides;
        a source of a rapidly flowing wastewater stream directed generally toward the microorganism clad structure; and
        an apparatus adapted to introduce into the rapidly flowing wastewater stream a concentration of at least one atmospheric gas which is enhanced relative to the concentration of that atmospheric gas within the wastewater adjacent to the rapidly flowing wastewater stream at the point at which the stream is introduced into the body of wastewater,
        wherein the output regions of at least some of the plurality of floating wastewater treatment devices are adjacent the input region of a separate floating wastewater treatment device;
    introducing a first quantity of wastewater into the input region of a first floating wastewater treatment device;
    conveying at least some of the output of the first floating wastewater treatment device to the adjacent input of a succession of at least one floating wastewater treatment devices; and
    conveying at least some of the output of the last of the floating wastewater treatment devices out of the water containment reservoir containing a body of wastewater.

2. The method of claim 1, wherein at least some of the plurality of floating wastewater treatment devices include microorganism clad structures in which the microorganisms cladding the microorganism clad structures are different from the microorganisms cladding the microorganism clad structures of at least one of the preceding succession of floating wastewater treatment devices.

3. The method of claim 1, wherein at least some floating wastewater treatment devices of the succession of floating wastewater treatment devices introduce at least one atmospheric gas which is enhanced relative to the concentration of that atmospheric gas within the wastewater adjacent to the rapidly flowing wastewater stream at the point at which the stream is introduced into the body of wastewater which differs from the atmospheric gas introduced in a succeeding floating wastewater treatment device.

4. The method of claim 1, wherein the output of at least one floating wastewater treatment device is divided to provide a portion of the input for more than one floating wastewater treatment device.

5. The method of claim 1, wherein the input of at least one floating wastewater treatment device is provided by a portion of the output from more than one floating wastewater treatment device.

6. The method of claim 1, wherein the input of at least one floating wastewater treatment device is provided by a portion of the output of that floating wastewater treatment device.

7. The method of claim 1, further comprising supplying one or more nutrients for the microorganisms.

8. The method of claim 1, further comprising altering the temperature of the wastewater.

9. The method of claim 1, further comprising a first group of floating wastewater treatment device and a second group of floating wastewater treatment devices.

10. The method of claim 9, wherein the first group of one or more floating wastewater treatment devices is separated from the second group of floating wastewater treatment devices by baffles having an input region and an output region.

* * * * *